United States Patent
Weng et al.

(10) Patent No.: US 8,718,852 B2
(45) Date of Patent: May 6, 2014

(54) SELF-LEARNING REGENERATIVE BRAKING CONTROL MODULE, CONTROLLER, AND VEHICLE USING THE SAME

(71) Applicant: Automotive Research & Testing Center, Changhua County (TW)

(72) Inventors: Kuo-Liang Weng, Changhua County (TW); Chien-An Chen, Changhua County (TW); Deng-He Lin, Changhua County (TW); Ming-Chih Lin, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 0 days.

(21) Appl. No.: 13/727,448

(22) Filed: Dec. 26, 2012

(65) Prior Publication Data

US 2014/0081498 A1     Mar. 20, 2014

(30) Foreign Application Priority Data

Sep. 14, 2012   (TW) .............................. 101133723 A

(51) Int. Cl.
*B60K 6/00* (2006.01)
*B60L 3/00* (2006.01)

(52) U.S. Cl.
USPC ........................ 701/22; 180/65.265; 903/930

(58) Field of Classification Search
CPC .  B06W 10/10; B06W 10/18; B06W 20/1062; B06W 2030/18072; B60T 1/10; B60T 7/042; B60T 7/085; B60T 7/107; B60K 6/28; B60K 6/30; B60K 6/00
USPC ......... 701/22, 70, 79, 81; 307/9.1; 180/65.21, 180/65.265, 65.275; 903/904, 930, 947
See application file for complete search history.

(56) References Cited

U.S. PATENT DOCUMENTS

| | | | | |
|---|---|---|---|---|
| 7,758,467 | B2* | 7/2010 | Ashizawa et al. | 477/5 |
| 7,892,139 | B2* | 2/2011 | Kaltenbach | 477/5 |
| 8,005,588 | B2* | 8/2011 | Dower | 701/22 |
| 8,517,892 | B2* | 8/2013 | Schulte et al. | 477/5 |
| 2012/0297136 | A1* | 11/2012 | Galloway et al. | 711/114 |

* cited by examiner

*Primary Examiner* — Yonel Beaulieu
(74) *Attorney, Agent, or Firm* — Allston L. Jones; Peters Verny, LLP

(57) ABSTRACT

A self-learning regenerative braking control module is adapted for use with a vehicle, and includes a driving mode determining unit, an analyzing unit, and a regenerative braking determining unit. The driving mode determining unit determines a driving mode according to an accelerator signal, a brake signal, and a speed signal from the vehicle and outputs a coasting duration and coasting information associated with the driving mode to the analyzing unit for obtaining acceleration information. The regenerative braking determining unit obtains target regenerative braking data containing target vehicle speeds that vary with time based upon the acceleration information and regenerative braking reference data stored therein.

17 Claims, 8 Drawing Sheets

| Driving Mode | Determination Basis | | | | |
|---|---|---|---|---|---|
| | Depth Value of Accelerator Pedal | Δ Depth Value of Accelerator Pedal | Depth Value of Brake Pedal | Δ Depth Value of Brake Pedal | Δ Movement Speed of Vehicle |
| Coasting Acceleration Mode | <TPS1 | <TPS2 | — | — | <V1 |
| Coasting Deceleration Mode | — | — | <B1 | <B2 | <V2 |

FIG. 2

SELF-LEARNING REGENERATIVE BRAKING CONTROL MODULE, CONTROLLER, AND VEHICLE USING THE SAME

BACKGROUND OF THE INVENTION

1. Field of the Invention

The invention relates to a module, a controller, and a vehicle, and more particularly to a self-learning regenerative braking control module, controller, and a vehicle with regenerative braking control.

2. Description of the Related Art

Due to rise of gasoline prices and trend toward energy saving, industries have started to place a lot of effort on the development of electric vehicles. For further energy saving, energy regeneration during braking operation is an important target.

In a vehicle model iMiev available from Mitsubishi motors, energy regeneration ratio is adjusted via switching among three gear ratios thereof for standard use, increasing energy regeneration ratio, and decreasing energy regeneration ratio, respectively.

In a vehicle model TOBE W' car EV available from Yulon, the driver may adjust energy regeneration ratio via a knob.

In a vehicle model Luxgen MPV EV available from Luxgen, the driver may adjust energy regeneration ratio via a shaft.

However, the driver still has to manually adjust energy regeneration ratio in the aforesaid vehicle models, which may reduce comfort during driving and result in distraction of the driver.

SUMMARY OF THE INVENTION

Therefore, an object of the present invention is to provide a regenerative braking control self-learning module that can overcome the above drawbacks of the prior art.

According to one aspect of the present invention, a self-learning regenerative braking control module is adapted for use with a vehicle, and comprises:

a driving mode determining unit disposed to receive an accelerator signal, a brake signal, and a speed signal from the vehicle, and operable to determine a driving mode of the vehicle according to the accelerator signal, the brake signal, and the speed signal, and to output a coasting duration and coasting information associated with the driving mode determined thereby;

an analyzing unit coupled to the driving mode determining unit for receiving the coasting duration and the coasting information, and operable to obtain acceleration information according to the coasting duration and the coasting information; and a regenerative braking determining unit coupled to the analyzing unit for receiving and recording the acceleration information, stored with regenerative braking reference data containing preset vehicle speeds that are reduced with time, and operable to obtain target regenerative braking data containing target vehicle speeds that vary with time based upon the acceleration information and the regenerative braking reference data.

Another object of the present invention is to provide a regenerative braking controller that can overcome the above drawbacks of the prior art.

According to another aspect of the present invention, a regenerative braking controller comprises:

a self-learning regenerative braking control module of the present invention; and a control module coupled to the regenerative braking determining unit for receiving the target regenerative braking data, and operable to generate a control signal associated with the target regenerative braking data.

Yet another object of the present invention is to provide a vehicle that can overcome the above drawbacks of the prior art.

According to yet another aspect of the present invention, a vehicle with regenerative braking control comprises:

a vehicle body;

a regenerative braking controller of the present invention; and a power device disposed to receive an input power and controlled by the control signal from the control module to convert the input power into a driving power to drive movement of the vehicle body.

BRIEF DESCRIPTION OF THE DRAWINGS

Other features and advantages of the present invention will become apparent in the following detailed description of the preferred embodiments with reference to the accompanying drawings, of which:

FIG. 2 is a table illustrating conditions for determining driving mode of the first preferred embodiment;

DETAILED DESCRIPTION OF THE PREFERRED EMBODIMENTS

Figure 1:
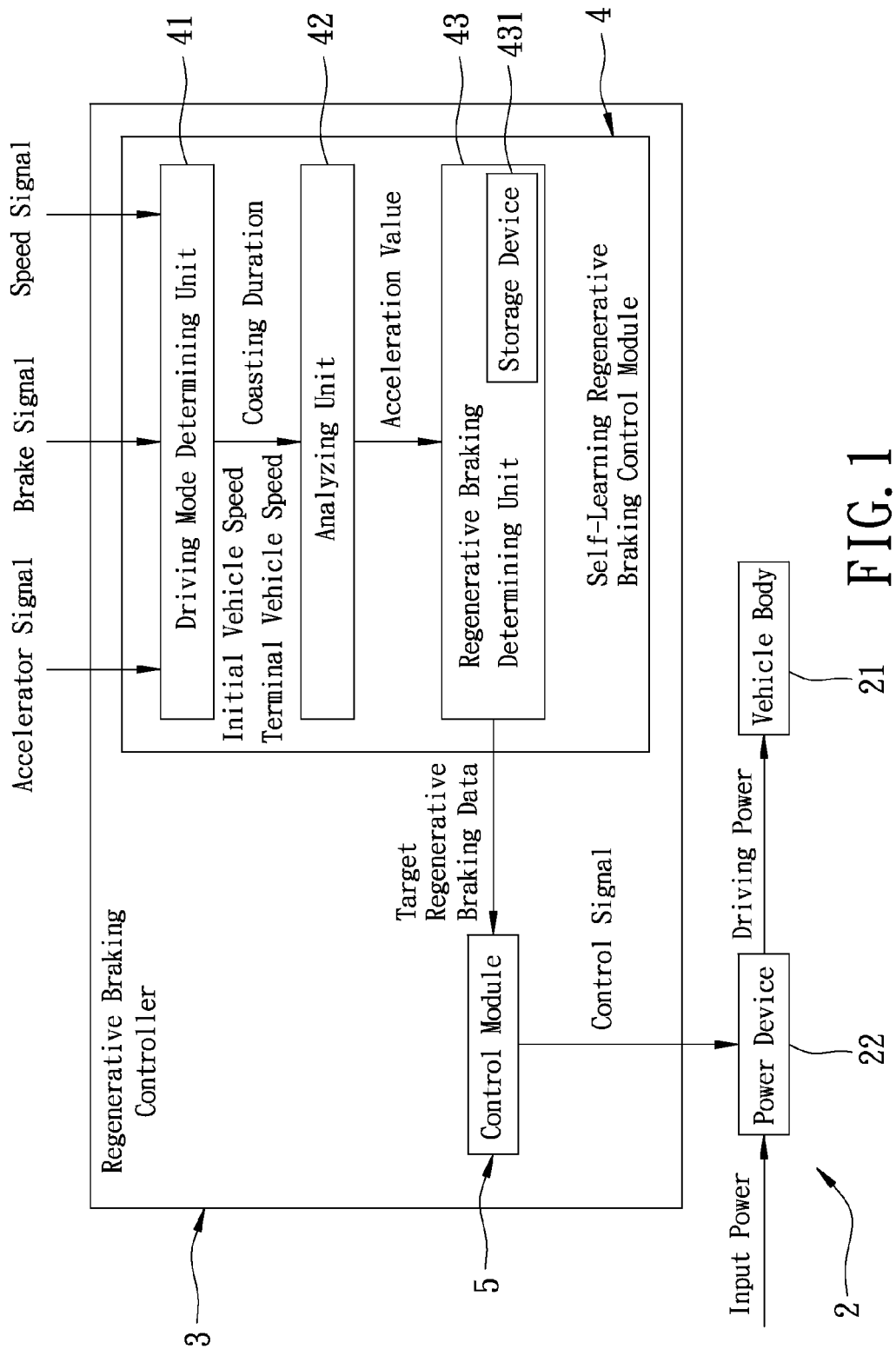
FIG. 1 is a block diagram showing a first preferred embodiment of the vehicle with regenerative braking control according to the present invention.

Referring to FIG. 1, a first preferred embodiment of the vehicle 2 with regenerative braking control according to this invention is shown to include a vehicle body 21, a power device 22, and a regenerative braking controller 3.

The power device 22 is disposed to receive an input power and is controlled by a control signal from the regenerative braking controller 3 to convert the input power into a driving power to drive movement of the vehicle body 21.

The regenerative braking controller 3 includes a self-learning regenerative braking control module 4 and a control module 5.

The self-learning regenerative braking control module 4 includes a driving mode determining unit 41, an analyzing unit 42 coupled to the driving mode determining unit 41, and a regenerative braking determining unit 43 coupled to the analyzing unit 42.

The driving mode determining unit 41 is disposed to receive an accelerator signal, a brake signal, and a speed signal from the vehicle body 21, determines a driving mode of the vehicle 2 according to the accelerator signal, the brake signal, and the speed signal, and outputs a coasting duration T and coasting information associated with the driving mode determined thereby.

Referring to FIG. 1 and FIG. 2, in this embodiment, the driving mode determining unit 41 is stored with a preset accelerator value TPS1, a preset accelerator variation value TPS2, and a preset acceleration value V1. The accelerator signal indicates a depth value of an accelerator pedal of the vehicle 2, and the speed signal indicates a movement speed of the vehicle 2.

The driving mode determining unit 41 compares the depth value of the accelerator pedal of the vehicle 2 and the preset accelerator value TPS1, compares variation of the depth value of the accelerator pedal of the vehicle 2 per unit time and the preset accelerator variation value TPS2, compares variation of the movement speed of the vehicle 2 per unit time and the preset acceleration value V1, and determines that the driving mode is a coasting acceleration mode when the depth value of the accelerator pedal of the vehicle 2 is smaller than the preset accelerator value TPS1, the variation of the depth value of the accelerator pedal of the vehicle 2 per unit time is smaller than the preset accelerator variation value TPS2, and the variation of the movement speed of the vehicle 2 per unit time is smaller than the preset acceleration value V1. In other embodiments, the driving mode determining unit 41 may be stored with only the preset accelerator value TPS1 and the preset acceleration value V1, and determines that the driving mode is a coasting acceleration mode based upon comparison results using only the preset accelerator value TPS1 and the preset acceleration value V1 as described above.

Under the coasting acceleration mode, the driving mode determining unit 41 further obtains the coasting duration T based upon a time difference between a beginning and an end of the coasting acceleration mode, and records an initial vehicle speed Vs and a terminal vehicle speed Vp of the coasting acceleration mode as the coasting information.

In this embodiment, the driving mode determining unit 41 is further stored with a preset brake value B1, a preset brake variation value B2, and a preset deceleration value V2. The brake signal indicates a depth value of a brake pedal of the vehicle 2.

The driving mode determining unit 41 compares the depth value of the brake pedal of the vehicle 2 and the preset brake value B1, compares variation of the depth value of the brake pedal of the vehicle 2 per unit time and the preset brake variation value B2, compares variation of the movement speed of the vehicle 2 per unit time and the preset deceleration value V2, and determines that the driving mode is a coasting deceleration mode when the depth value of the brake pedal of the vehicle 2 is smaller than the preset brake value B1, the variation of the depth value of the brake pedal of the vehicle 2 per unit time is smaller than the preset brake variation value B2, and the variation of the movement speed of the vehicle 2 per unit time is smaller than the preset deceleration value V2. In other embodiments, the driving mode determining unit 41 may be stored with only the preset brake value B1 and the preset deceleration value V2, and determines that the driving mode is a coasting deceleration mode based upon comparison results using only the preset brake value B1 and the preset deceleration value V2 as described above.

Under the coasting deceleration mode, the driving mode determining unit 41 further obtains the coasting duration T based upon a time difference between a beginning and an end of the coasting deceleration mode, and records an initial vehicle speed Vs and a terminal vehicle speed Vp of the coasting deceleration mode as the coasting information.

The analyzing unit 42 receives the coasting duration T, the initial vehicle speed Vs, and the terminal vehicle speed Vp from the driving mode determining unit 41, and obtains acceleration information according to the coasting duration T, the initial vehicle speed Vs, and the terminal vehicle speed Vp. In this embodiment, the acceleration information is an acceleration value A, and is obtained using the equation $A=(Vp-Vs)/T$.

The regenerative braking determining unit 43 receives the acceleration information from the analyzing unit 42, and includes a storage device 431 for storing the acceleration value A. The regenerative braking determining unit 43 is further stored with regenerative braking reference data containing preset vehicle speeds that are reduced with time, and obtains an average of the acceleration value A stored therein $$(\sum_{i=1}^{n} Ai/n,$$

where n is a number of the stored acceleration values A), followed by obtaining target regenerative braking data containing target vehicle speeds that vary with time based upon the average of the acceleration values A stored in the storage device 431 and the regenerative braking reference data.

The control module 5 is coupled to the regenerative braking determining unit 43 for receiving the target regenerative braking data, and generates the control signal associated with the target regenerative braking data to the power device 22.

Figure 3:
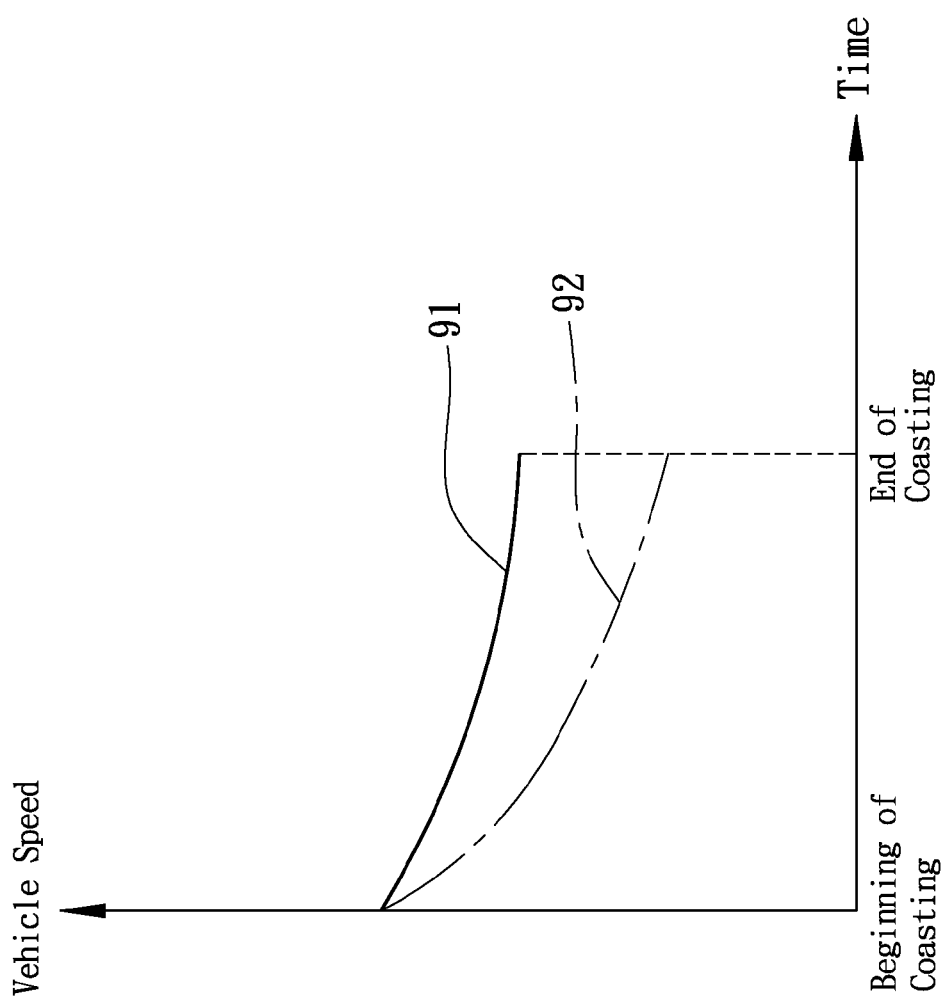
FIG. 3 is a plot illustrating a relationship between time and vehicle speed of regenerative braking reference data.

Referring to FIG. 1 and FIG. 3, the vehicle 2 starts coasting when the accelerator pedal and the brake pedal thereof are released, and the vehicle speed will be gradually reduced due to ground friction. In FIG. 3, the curve 91 illustrates a relationship between the vehicle speed and time without regenerative braking control, and the curve 92 illustrates a relationship between the vehicle speed and time with the power device 22 being controlled by the control module 5 according to the regenerative braking reference data. Difference between the curves 91, 92 indicates the regenerative energy from the regenerative braking control, so that ratio of the regenerative energy may be adjusted via adjustment of the curve 92.

However, different drivers may have different driving behaviors. For example, some drivers may have a habit of sudden braking whereas some drivers may prefer a smooth coasting. Therefore, the regenerative braking reference data may not be suitable for all drivers. The driver may step on the accelerator pedal or the brake pedal as desired while the vehicle 2 coasts according to the regenerative braking reference data.

Figure 4:
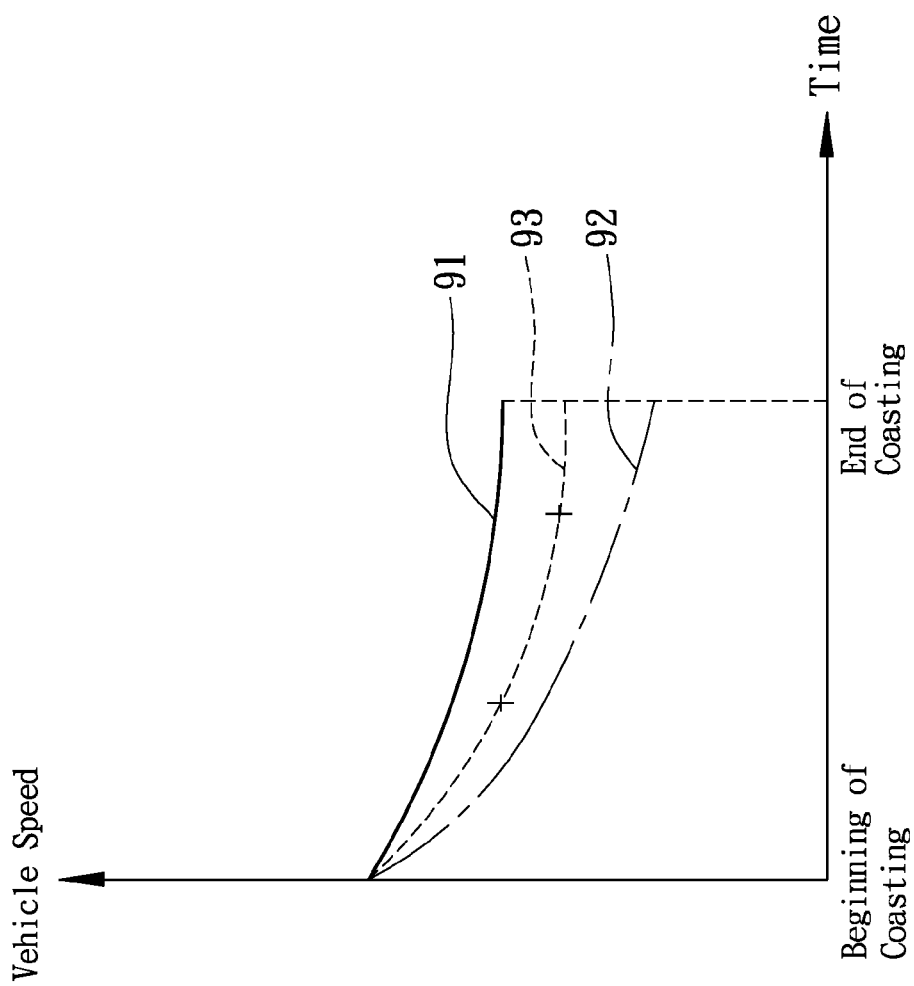
FIG. 4 is a plot illustrating a relationship between time and vehicle speed under a coasting acceleration mode.

Referring to FIG. 1 and FIG. 4, when the driver steps on the accelerator pedal for countering decrease of the vehicle speed during coasting, the driving mode may be determined to be the coasting acceleration mode according to the comparison results as mentioned above. In FIG. 4, "+" indicates a time that the driver steps on the accelerator pedal. The driving mode determining unit 41 provides the coasting duration T, the initial vehicle speed Vs, and the terminal vehicle speed Vp to the analyzing unit 42, and the analyzing unit 42 obtains the acceleration value A. The acceleration value A is then stored into the storage device 431 for subsequent calculation of the target regenerative braking data by the regenerative braking determining unit 43 according to the acceleration value A and the regenerative braking reference data for use by the control module 5 at further coasting. The curve 93 indicates the target regenerative braking data, and difference between the curve 93 and the curve 91 indicates regenerative energy using the target regenerative braking data.

Figure 5:
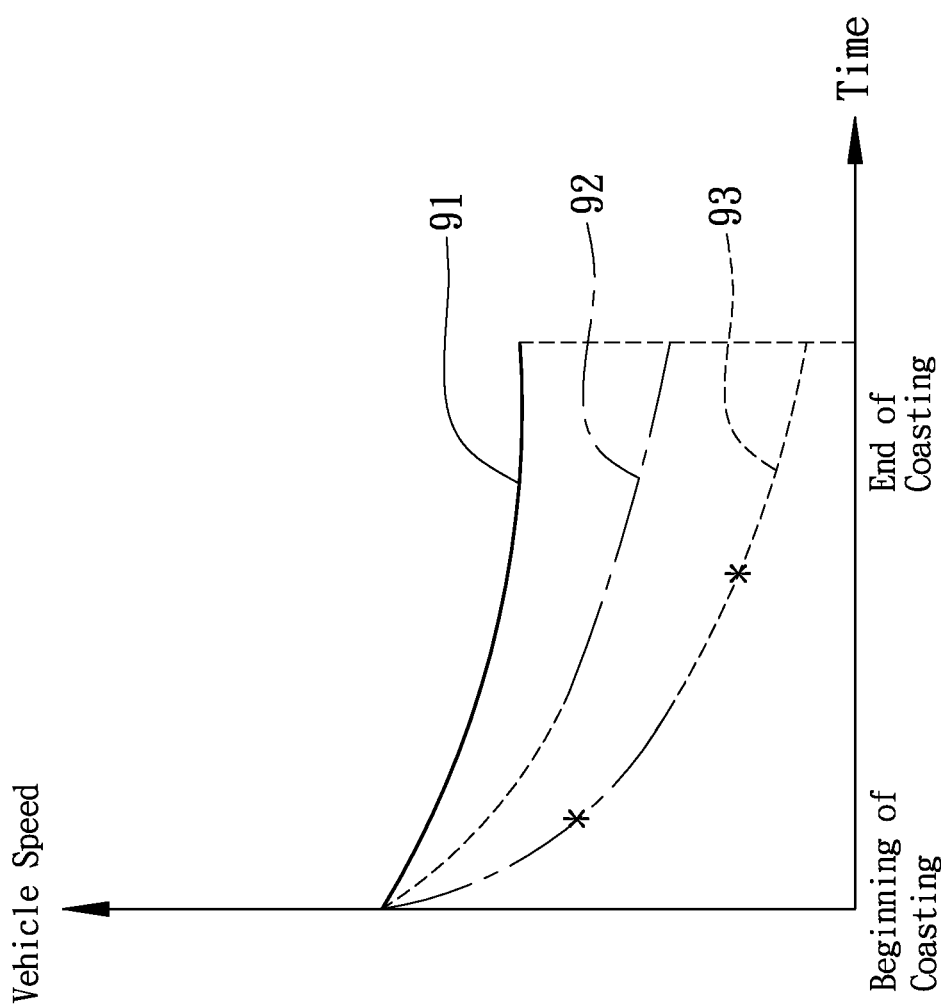
FIG. 5 is a plot illustrating a relationship between time and vehicle speed under a coasting deceleration mode.

Referring to FIG. 1 and FIG. 5, when the driver steps on the brake pedal for further reducing the vehicle speed during coasting, the driving mode may be determined to be the coasting deceleration mode according to the comparison results as mentioned above. In FIG. 5, "*" indicates a time that the driver steps on the brake pedal. The curve 93 indicates the target regenerative braking data, and difference between the curve 93 and the curve 91 indicates regenerative energy using the target regenerative braking data. Operation in the coasting deceleration mode is similar to that in the coasting acceleration mode, and details thereof are not repeated herein for the sake of brevity.

Figure 6:
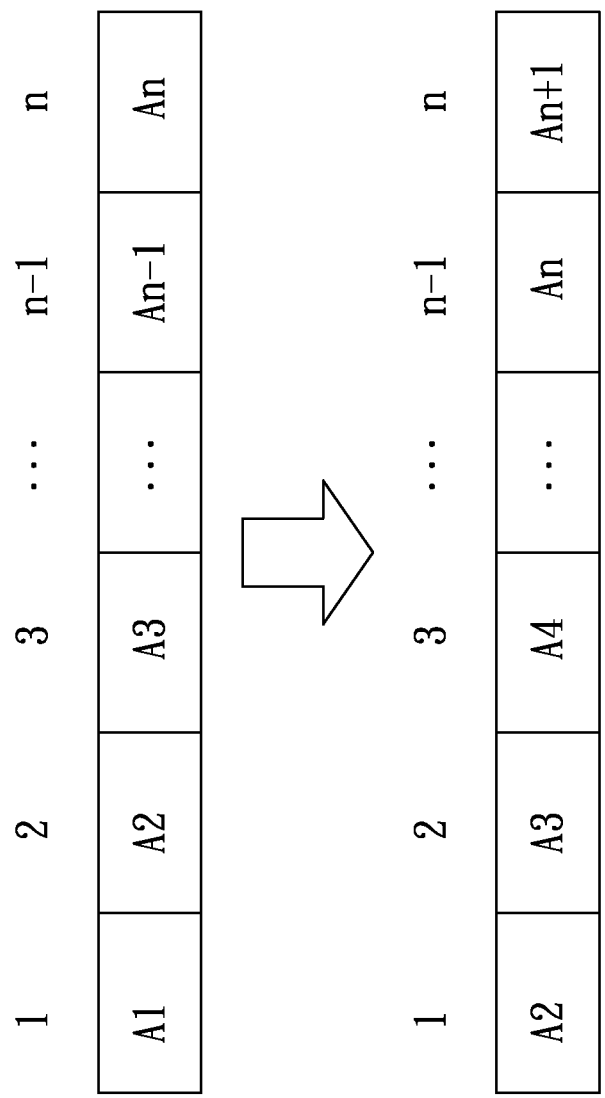
FIG. 6 is a schematic diagram illustrating an implementation of a storage device of the first preferred embodiment in a manner of a linear queue.

Referring to FIG. 1 and FIG. 6, in this embodiment, the number n is a predetermined number, and the regenerative braking determining unit 43 calculates the average of the acceleration values A1~An only when number of the acceleration values A is accumulated to be n, and obtains the target regenerative braking data based upon the average of the acceleration values A and the regenerative braking reference data. Subsequently, with each update of one or a predetermined number of the acceleration values (e.g., An+1), the regenerative braking determining unit 43 calculates a new average of the acceleration values A and new target regenerative braking data according to the new acceleration values (e.g., A2~An+1).

Figure 7:
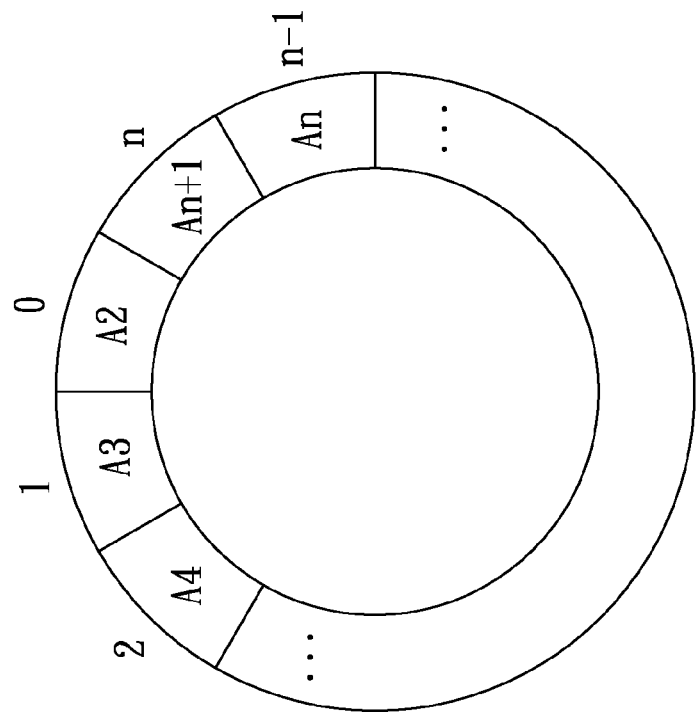
FIG. 7 is a schematic diagram illustrating an implementation of a storage device of the first preferred embodiment in a manner of a circular queue.
Figure 7:
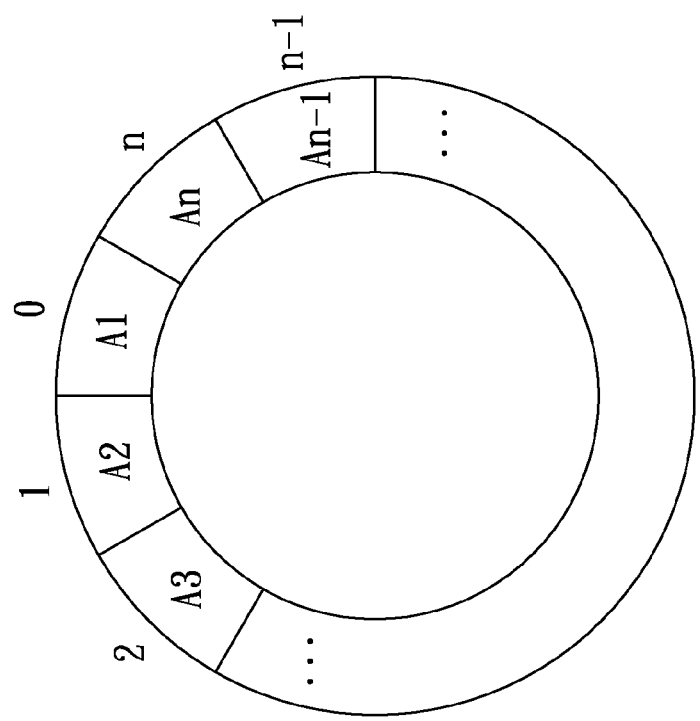

It should be noted that the storage device 431 operates in a manner of first-in-first-out, and may be implemented but not limited to using a linear queue manner as shown in FIG. 6, or using a circular queue manner as shown in FIG. 7.

Figure 8:
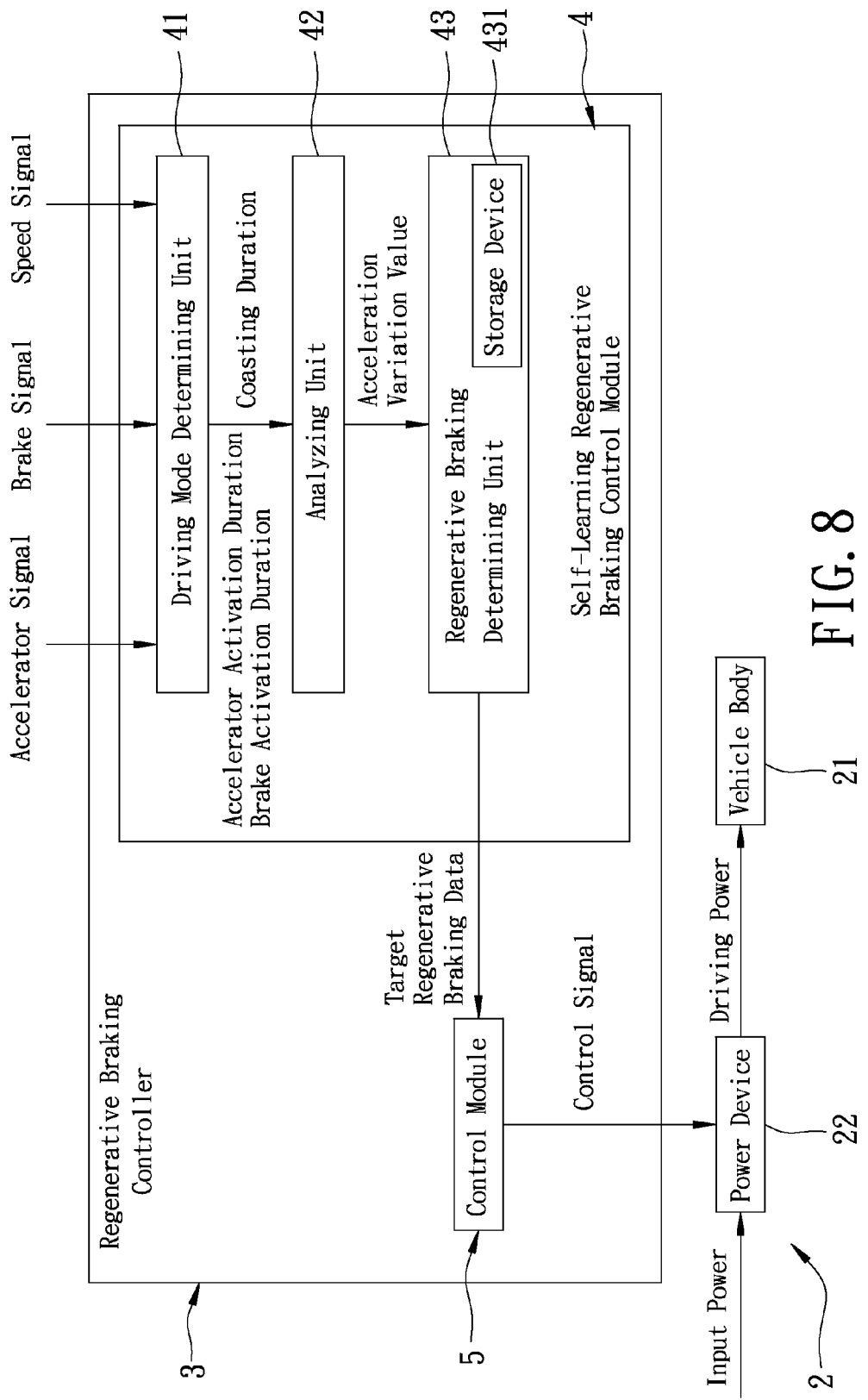
FIG. 8 is a block diagram showing a second preferred embodiment of the vehicle with regenerative braking control according to the present invention.

Referring to FIG. 8, a second preferred embodiment of a vehicle 2 with regenerative braking control according to this invention is shown to be similar to the first preferred embodiment. The difference between the first and second preferred embodiments will be described hereinafter.

Under both of the coasting acceleration mode and the coasting deceleration mode, the driving mode determining unit 41 records an accelerator activation duration $\Delta t\_tps$ associated with a time period during which the accelerator pedal is stepped on, and a brake activation duration $\Delta t\_b$ associated with a time period during which the brake pedal is stepped on, as the coasting information.

The analyzing unit 42 is stored with an acceleration reference value Ar, receives the coasting duration T, the accelerator activation duration $\Delta t\_tps$, and the brake activation duration $\Delta t\_b$ from the driving mode determining unit 41, and obtains an acceleration variation value $\Delta A$ as the acceleration information based upon the coasting duration T, the accelerator activation duration $\Delta t\_tps$, the brake activation duration $\Delta t\_b$, and the acceleration reference value Ar using the equation $\Delta A=[(\Sigma \Delta t\_b - \Sigma \Delta t\_tps)/T]*Ar$.

The regenerative braking determining unit 43 receives and stores the acceleration variation value $\Delta A$ from the analyzing unit 42 into the storage device 431. The regenerative braking determining unit 43 obtains an average of the acceleration variation values $\Delta A$ stored therein, followed by obtaining the target regenerative braking data containing target vehicle speeds that vary with time based upon the average of the acceleration variation values $\Delta A$ stored in the storage device 431 and the regenerative braking reference data.

To sum up, the present invention is advantageous in that:

1. Based upon the accelerator signal, the brake signal, and the speed signal, the driving mode may be determined and the target regenerative braking data may be calculated. In addition, the target regenerative braking data may be corrected according to the current driving condition, such that the ratio of regenerative energy is automatically adjusted to conform with the driving behavior of the driver, and to achieve balance between energy saving and driving comfort.

2. The driving mode determining unit 41 determines whether or not the vehicle 2 operates under a coasting condition for omitting records of the vehicle speed during non-coasting condition, so as to achieve precise adjustment of the target regenerative braking data under the coasting condition.

3. Calculation of the target regenerative braking data is performed after the storage device 431 is stored with a predetermined number of acceleration information, so as to minimize the effect of sudden acceleration or sudden deceleration. Therefore, the target regenerative braking data will not be overly altered in such events so as to be adaptive to the general driving behavior of the driver.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A self-learning regenerative braking control module adapted for use with a vehicle, said self-learning regenerative braking control module comprising:

a driving mode determining unit disposed to receive an accelerator signal, a brake signal, and a speed signal from the vehicle, and operable to determine a driving mode of the vehicle according to the accelerator signal, the brake signal, and the speed signal, and to output a coasting duration and coasting information associated with the driving mode determined thereby;

an analyzing unit coupled to said driving mode determining unit for receiving the coasting duration and the coasting information, and operable to obtain acceleration information according to the coasting duration and the coasting information; and a regenerative braking determining unit coupled to said analyzing unit for receiving and recording the acceleration information, stored with regenerative braking reference data containing preset vehicle speeds that are reduced with time, and operable to obtain target regenerative braking data containing target vehicle speeds that vary with time based upon the acceleration information and the regenerative braking reference data.

2. The self-learning regenerative braking control module as claimed in claim 1, wherein said driving mode determining unit is stored with a preset accelerator value and a preset acceleration value, the accelerator signal indicates a depth value of an accelerator pedal of the vehicle, and the speed signal indicates a movement speed of the vehicle;

said driving mode determining unit being further operable to compare the depth value of the accelerator pedal of the vehicle and the preset accelerator value, to compare variation of the movement speed of the vehicle per unit time and the preset acceleration value, and to determine that the driving mode is a coasting acceleration mode at least when the depth value of the accelerator pedal of the vehicle is smaller than the preset accelerator value, and the variation of the movement speed of the vehicle per unit time is smaller than the preset acceleration value;

said driving mode determining unit being further operable to obtain the coasting duration based upon a time difference between a beginning and an end of the coasting acceleration mode, and to record an initial vehicle speed and a terminal vehicle speed of the coasting acceleration mode as the coasting information.

3. The self-learning regenerative braking control module as claimed in claim 2, wherein said analyzing unit is operable to obtain an acceleration value as the acceleration information based upon the coasting duration, the initial vehicle speed, and the terminal vehicle speed.

4. The self-learning regenerative braking control module as claimed in claim 2, wherein said driving mode determining unit is further stored with a preset accelerator variation value, and is further operable to compare variation of the depth value of the accelerator pedal of the vehicle per unit time and the preset accelerator variation value, said driving mode determining unit determining that the driving mode is the coasting acceleration mode when the variation of the depth value of the accelerator pedal of the vehicle per unit time is also smaller than the preset accelerator variation value.

5. The self-learning regenerative braking control module as claimed in claim 1, wherein said driving mode determining unit is stored with a preset brake value and a preset deceleration value, the brake signal indicates a depth value of a brake pedal of the vehicle, and the speed signal indicates a movement speed of the vehicle;

said driving mode determining unit being further operable to compare the depth value of the brake pedal of the vehicle and the preset brake value, to compare variation of the movement speed of the vehicle per unit time and the preset deceleration value, and to determine that the driving mode is a coasting deceleration mode at least when the depth value of the brake pedal of the vehicle is smaller than the preset brake value, and the variation of the movement speed of the vehicle per unit time is smaller than the preset deceleration value;

said driving mode determining unit being further operable to obtain the coasting duration based upon a time difference between a beginning and an end of the coasting deceleration mode, and to record an initial vehicle speed and a terminal vehicle speed of the coasting deceleration mode as the coasting information.

6. The self-learning regenerative braking control module as claimed in claim 5, wherein said analyzing unit is operable to obtain an acceleration value as the acceleration information based upon the coasting duration, the initial vehicle speed, and the terminal vehicle speed.

7. The self-learning regenerative braking control module as claimed in claim 5, wherein said driving mode determining unit is further stored with a preset brake variation value, and is further operable to compare variation of the depth value of the brake pedal of the vehicle per unit time and the preset brake variation value, said driving mode determining unit determining that the driving mode is the coasting deceleration mode when the variation of the depth value of the brake pedal of the vehicle per unit time is also smaller than the preset brake variation value.

8. The self-learning regenerative braking control module as claimed in claim 1, wherein said regenerative braking determining unit includes a storage device for storing the acceleration information, said regenerative braking determining unit being operable to obtain an average of the acceleration information stored therein, and to obtain the target regenerative braking data based upon the average of the acceleration information and the regenerative braking reference data.

9. The self-learning regenerative braking control module as claimed in claim 1, wherein said driving mode determining unit is stored with a preset accelerator value, a preset acceleration value, and a preset accelerator variation value, the accelerator signal indicates a depth value of an accelerator pedal of the vehicle, and the speed signal indicates a movement speed of the vehicle;

said driving mode determining unit being further operable to compare the depth value of the accelerator pedal of the vehicle and the preset accelerator value, to compare variation of the movement speed of the vehicle per unit time and the preset acceleration value, to compare variation of the depth value of the accelerator pedal of the vehicle per unit time and the preset accelerator variation value, and to determine that the driving mode is a coasting acceleration mode when the depth value of the accelerator pedal of the vehicle is smaller than the preset accelerator value, the variation of the movement speed of the vehicle per unit time is smaller than the preset acceleration value, and the variation of the depth value of the accelerator pedal of the vehicle per unit time is smaller than the preset accelerator variation value;

said driving mode determining unit being further operable to obtain the coasting duration based upon a time difference between a beginning and an end of the coasting acceleration mode, and to record, under the coasting acceleration mode, an accelerator activation duration associated with a time period during which the accelerator pedal is stepped on, and a brake activation duration associated with a time period during which the brake pedal is stepped on, as the coasting information.

10. The self-learning regenerative braking control module as claimed in claim 9, wherein said analyzing unit is stored with an acceleration reference value, and is further operable to obtain an acceleration variation value as the acceleration information based upon the coasting duration, the accelerator activation duration, the brake activation duration, and the acceleration reference value.

11. The self-learning regenerative braking control module as claimed in claim 1, wherein said driving mode determining unit is stored with a preset brake value, a preset deceleration value, and a preset brake variation value, the brake signal indicates a depth value of a brake pedal of the vehicle, and the speed signal indicates a movement speed of the vehicle;

said driving mode determining unit being further operable to compare the depth value of the brake pedal of the vehicle and the preset brake value, to compare variation of the movement speed of the vehicle per unit time and the preset deceleration value, to compare variation of the depth value of the brake pedal of the vehicle per unit time and the preset brake variation value, and to determine that the driving mode is a coasting deceleration mode when the depth value of the brake pedal of the vehicle is smaller than the preset brake value, the variation of the movement speed of the vehicle per unit time is smaller than the preset deceleration value, and the variation of the depth value of the brake pedal of the vehicle per unit time is smaller than the preset brake variation value;

said driving mode determining unit being further operable to obtain the coasting duration based upon a time difference between a beginning and an end of the coasting deceleration mode, and to record, under the coasting deceleration mode, an accelerator activation duration associated with a time period during which the accelerator pedal is stepped on, and a brake activation duration associated with a time period during which the brake pedal is stepped on, as the coasting information.

12. The self-learning regenerative braking control module as claimed in claim 11, wherein said analyzing unit is stored with an acceleration reference value, and is further operable to obtain an acceleration variation value as the acceleration information based upon the coasting duration, the accelerator activation duration, the brake activation duration, and the acceleration reference value.

13. A regenerative braking controller, comprising:
- a self-learning regenerative braking control module adapted for use with a vehicle, and including:
  - a driving mode determining unit disposed to receive an accelerator signal, a brake signal, and a speed signal from the vehicle, and operable to determine a driving mode of the vehicle according to the accelerator signal, the brake signal, and the speed signal, and to output a coasting duration and coasting information associated with the driving mode determined thereby;
  - an analyzing unit coupled to said driving mode determining unit for receiving the coasting duration and the coasting information, and operable to obtain acceleration information according to the coasting duration and the coasting information; and
  - a regenerative braking determining unit coupled to said analyzing unit for receiving and recording the acceleration information, stored with regenerative braking reference data containing preset vehicle speeds that are reduced with time, and operable to obtain target regenerative braking data containing target vehicle speeds that vary with time based upon the acceleration information and the regenerative braking reference data; and
- a control module coupled to said regenerative braking determining unit for receiving the target regenerative braking data, and operable to generate a control signal associated with the target regenerative braking data.

14. The regenerative braking controller as claimed in claim 13, wherein said driving mode determining unit is stored with a preset accelerator value, a preset acceleration value, a preset accelerator variation value, a preset brake value, a preset deceleration value, and a preset brake variation value, the accelerator signal indicates a depth value of an accelerator pedal of the vehicle, the brake signal indicates a depth value of a brake pedal of the vehicle, and the speed signal indicates a movement speed of the vehicle;
- said driving mode determining unit being further operable to compare the depth value of the accelerator pedal of the vehicle and the preset accelerator value, to compare variation of the movement speed of the vehicle per unit time and the preset acceleration value, to compare variation of the depth value of the accelerator pedal of the vehicle per unit time and the preset accelerator variation value, and to determine that the driving mode is a coasting acceleration mode when the depth value of the accelerator pedal of the vehicle is smaller than the preset accelerator value, the variation of the movement speed of the vehicle per unit time is smaller than the preset acceleration value, and the variation of the depth value of the accelerator pedal of the vehicle per unit time is smaller than the preset accelerator variation value;
- said driving mode determining unit being further operable to compare the depth value of the brake pedal of the vehicle and the preset brake value, to compare the variation of the movement speed of the vehicle per unit time and the preset deceleration value, to compare variation of the depth value of the brake pedal of the vehicle per unit time and the preset brake variation value, and to determine that the driving mode is a coasting deceleration mode when the depth value of the brake pedal of the vehicle is smaller than the preset brake value, the variation of the movement speed of the vehicle per unit time is smaller than the preset deceleration value, and the variation of the depth value of the brake pedal of the vehicle per unit time is smaller than the preset brake variation value.

15. The regenerative braking controller as claimed in claim 14, wherein, under the coasting acceleration mode, said driving mode determining unit is further operable to obtain the coasting duration based upon a time difference between a beginning and an end of the coasting acceleration mode, and to record an initial vehicle speed and a terminal vehicle speed of the coasting acceleration mode as the coasting information;
- wherein, under the coasting deceleration mode, said driving mode determining unit is further operable to obtain the coasting duration based upon a time difference between a beginning and an end of the coasting deceleration mode, and to record an initial vehicle speed and a terminal vehicle speed of the coasting deceleration mode as the coasting information;
- wherein said analyzing unit is operable to obtain an acceleration value as the acceleration information corresponding to one of the coasting acceleration mode and the coasting deceleration mode based upon the coasting duration, the initial vehicle speed, and the terminal vehicle speed that correspond to said one of the coasting acceleration mode and the coasting deceleration mode; and
- wherein said regenerative braking determining unit includes a storage device for storing the acceleration information, said regenerative braking determining unit being operable to obtain an average of the acceleration information stored therein, and to obtain the target regenerative braking data based upon the average of the acceleration information and the regenerative braking reference data.

16. The regenerative braking controller as claimed in claim 14, wherein, under the coasting acceleration mode, said driving mode determining unit is further operable to obtain the coasting duration based upon a time difference between a beginning and an end of the coasting acceleration mode, and to record an accelerator activation duration associated with a time period during which the accelerator pedal is stepped on, and a brake activation duration associated with a time period during which the brake pedal is stepped on, as the coasting information;
- wherein, under the coasting deceleration mode, said driving mode determining unit is further operable to obtain the coasting duration based upon a time difference between a beginning and an end of the coasting deceleration mode, and to record an accelerator activation duration associated with a time period during which the accelerator pedal is stepped on, and a brake activation duration associated with a time period during which the brake pedal is stepped on, as the coasting information;
- wherein said analyzing unit is stored with an acceleration reference value, and is further operable to obtain an acceleration variation value as the acceleration information corresponding to one of the coasting acceleration mode and the coasting deceleration mode based upon the coasting duration, the accelerator activation duration, and the brake activation duration that correspond to said one of the coasting acceleration mode and the coasting deceleration mode, and the acceleration reference value;
- wherein said regenerative braking determining unit includes a storage device for storing the acceleration information, said regenerative braking determining unit being operable to obtain an average of the acceleration information stored therein, and to obtain the target regenerative braking data based upon the average of the acceleration information and the regenerative braking reference data.

17. A vehicle with regenerative braking control, said vehicle comprising:

a vehicle body;

a regenerative braking controller including:
- a self-learning regenerative braking control module including:
  - a driving mode determining unit disposed to receive an accelerator signal, a brake signal, and a speed signal from said vehicle body, and operable to determine a driving mode of the vehicle according to the accelerator signal, the brake signal, and the speed signal, and to output a coasting duration and coasting information associated with the driving mode determined thereby;
  - an analyzing unit coupled to said driving mode determining unit for receiving the coasting duration and the coasting information, and operable to obtain acceleration information according to the coasting duration and the coasting information; and
  - a regenerative braking determining unit coupled to said analyzing unit for receiving and recording the acceleration information, stored with regenerative braking reference data containing preset vehicle speeds that are reduced with time, and operable to obtain target regenerative braking data containing target vehicle speeds that vary with time based upon the acceleration information and the regenerative braking reference data; and
- a control module coupled to said regenerative braking determining unit for receiving the target regenerative braking data, and operable to generate a control signal associated with the target regenerative braking data; and a power device disposed to receive an input power and controlled by the control signal from said control module to convert the input power into a driving power to drive movement of said vehicle body.

* * * * *